E. MOTT.
CORN HARVESTER.
APPLICATION FILED OCT. 9, 1911.
1,050,979.　　　　　　　　　　　　　　Patented Jan. 21, 1913.
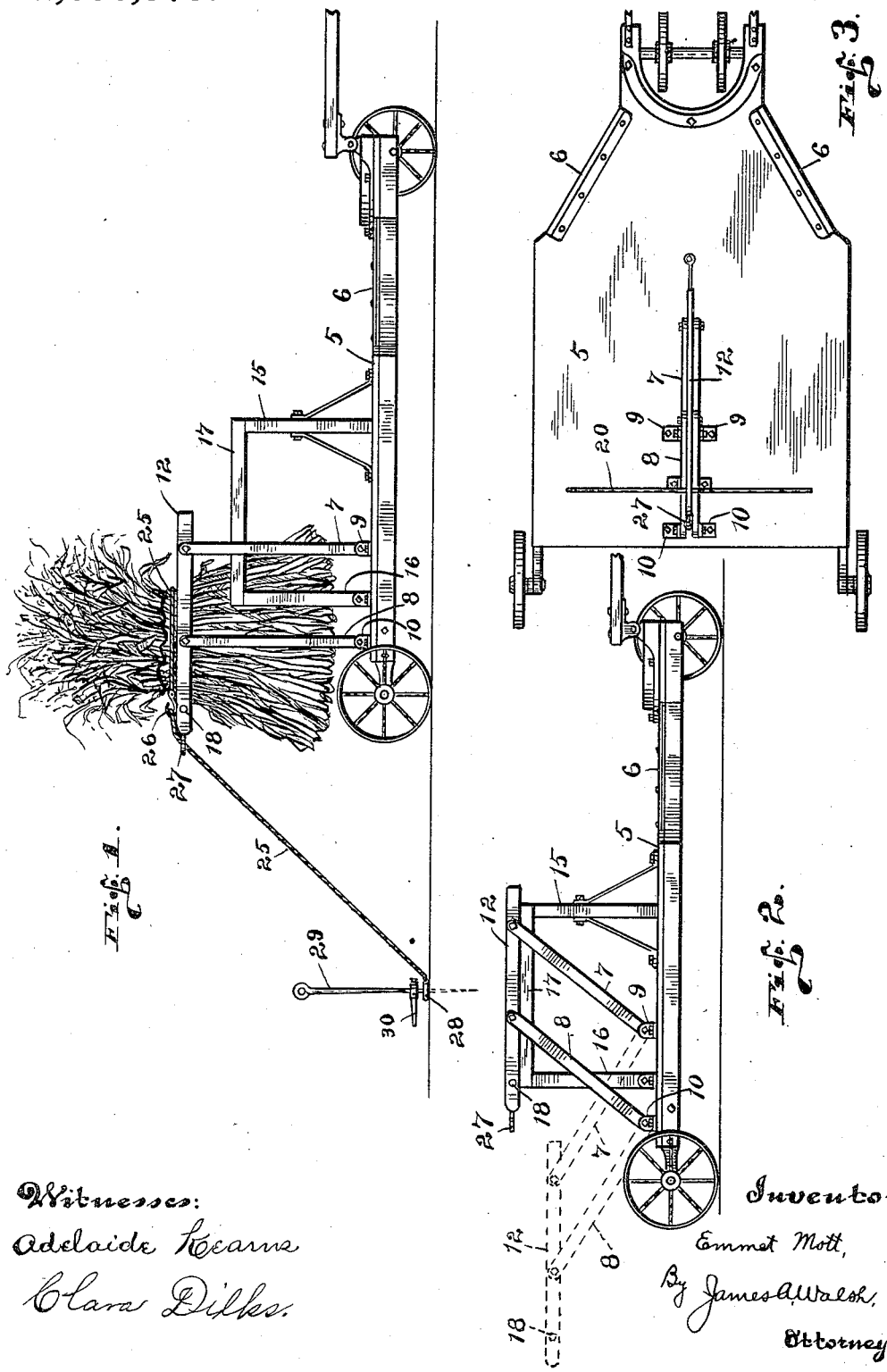

UNITED STATES PATENT OFFICE.

EMMET MOTT, OF COLUMBUS, OHIO.

CORN-HARVESTER.

1,050,979.  Specification of Letters Patent.  Patented Jan. 21, 1913.

Application filed October 9, 1911. Serial No. 653,473.

*To all whom it may concern:*

Be it known that I, EMMET MOTT, a citizen of the United States, residing at Columbus, in the county of Franklin and State of Ohio, have invented certain new and useful Improvements in Corn-Harvesters, of which the following is a specification.

My invention relates to improvements in corn shocking devices for corn harvesting machines, my object being to provide such a harvester with a simple, reliable and effective arrangement by which shocks may be formed and readily deposited upon the ground in upstanding position.

In the accompanying drawings, which form a part hereof, Figure 1 is a side elevation of a machine embodying my invention and showing the position of a shock as it is being removed, a portion of the shock being broken away to more clearly show my improved shock carrier; Fig. 2 is a side elevation showing the shock carrier in normal position on the machine, its position when depositing a shock upon the ground being indicated by dotted lines; and Fig. 3 is a plan of the machine.

In said drawings the portions marked 5 represent a wheeled platform, its forward end being provided with stalk-cutting knives, 6, designed to cut stalks as the machine is drawn forwardly through rows of corn. Longitudinally and preferably medianly of said platform 5 I provide a shock carrier comprising pairs of links, 7, 8, pivotally connected to said platform by brackets 9, 10, or otherwise, the upper ends of said links being connected by a bar, 12, in substantially the position indicated. As a means of supporting said carrier while forming and compressing a shock, and limiting its forward movement when returned to normal position after depositing a shock, I provide an upright frame comprising standards 15, 16, suitably secured to said platform 5 and connect said standards by a bar, 17, thus forming a rigid supporting structure. As indicated in Fig. 2, said links 7 and 8 are positioned outside of said frame so that when the carrier as a whole is adjusted rearwardly and forwardly said frame acts as a guide therefor, and when brought to forward or normal position bar 12 rests upon said bar 17. In the rear end of bar 12 an opening 18 is provided in which a transverse member, as a rod 20, may be removably secured for the purpose of leaning stalks against the same when forming a shock and to be removed when a shock has been deposited.

In the operation of my improved machine, as the same is drawn through a field between rows of corn the stalks are cut by the knives 6, which stalks are then placed upon platform 5 in upright position against the forward side of rod 20, and as they accumulate they are arranged forwardly along the platform and against carrier bar 12. When sufficient stalks have been thus arranged to make a complete shock the machine is stopped, and the end of a rope, 25, is noosed about the shock just above bar 12 by any suitable means such as a hook, 26, said rope being held in proper relation to the bar by passing the same through an eyelet, 27, in the end thereof, its opposite end being provided with a loop or ring, 28, through which a suitable anchoring rod, as 29, is inserted, and then forced into the ground by foot pressure on its transverse member, 30, or in any convenient manner. The machine is then advanced, which causes rope 25 to pull upon the shock together with the carrier about which it is formed, thus swinging the carrier and lifting the shock, as indicated in Fig. 1, so that when the links 7 and 8 swing rearwardly beyond their pivotal connections the shock with the carrier will by gravity descend and the shock be thus deposited upon the ground in vertical position, the carrier assuming the position indicated by dotted lines in Fig. 2. By this arrangement the shock at all times moves vertically, but does not move forwardly or rearwardly to any appreciable extent from its original position on the platform, which result is accomplished by moving the platform forwardly, so that the shock is deposited on the ground under the place it occupied on the platform. When deposited the shock is bound in the usual manner, the rope 25 is detached and together with its anchor is moved to the next position where it is desired to deposit a shock. After the shock has been deposited the rod 20 is removed, and the shock carrier is withdrawn by the forward movement of the machine, when said carrier may be returned to its normal position to rest upon the supporting frame as described, and rod 20 may be again inserted in the carrier for the formation of the next shock.

I claim as my invention:

1. In a shocking attachment for corn harvesters, a platform, a swinging frame mounted thereon comprising links and a connecting bar, and a support between said links about which said frame travels and upon which the same rests in normal position.

2. In a shocking attachment for corn harvesters, supporting means upon which corn stalks are vertically positioned, rearwardly swinging means about which stalks are arranged to form a shock, an upright support over which said swinging means travels and upon which the same is adapted to rest, and means for temporarily anchoring said shock to the ground whereby when said supporting means is moved said swinging means is caused to raise said shock therefrom and deposit the same in standing position upon the ground.

3. In a shocking attachment for corn harvesters, a platform upon which corn stalks are mounted, a vertically-arranged swinging frame mounted thereon and having a transverse movable member adapted to retain stalks on said support, a guide within said frame about which the same travels and upon which it rests when in normal position, and means for temporarily anchoring said stalks whereby when said support is moved said swinging frame is caused to raise said stalks and deposit the same in standing position upon the ground behind said support.

4. In a shocking attachment for corn harvesters, a movable platform, a carrier pivotally mounted thereon and about which corn stalks are arranged to form a shock, a guide within said carrier and upon which the same is adapted to rest, an anchor, and means communicating with said anchor and said shock whereby when said platform is moved said frame is caused to raise said shock therefrom and deposit the same in standing position upon the ground.

5. In a shocking attachment for corn harvesters, the combination, with a harvester frame, of a supporting frame rising therefrom, and a longitudinally arranged bar connected by links to said harvester frame and adapted to swing over and be normally supported on said supporting frame.

6. In a shocking attachment for corn harvesters, the combination, with a harvester frame having stalk cutting devices and supporting wheels, of a supporting frame rising therefrom, a longitudinally arranged bar having a swinging support from said harvester frame and adapted to be supported by said supporting frame when in shock building position and to be swung rearwardly and free therefrom to shock discharging position, and a removable rod in the rear end of said bar to retain shocks on said harvester frame.

7. In a shocking attachment for corn harvesters, the combination with the frame thereof, of a supporting frame, a longitudinally arranged bar adapted to rest thereupon, and parallel bars movably connected with said harvester frame and with said bar, said bars being positioned outside said supporting frame and adapted to travel longitudinally thereof.

8. In a shocking attachment for corn harvesters, the combination with the platform thereof, of a supporting frame, a longitudinally arranged bar adapted to rest thereupon, parallel bars pivotally connected with said platform and with said bar, said bars being positioned outside said supporting frame and adapted to travel longitudinally thereof and a removable rod in the outer or rear end portion of said bar to retain shocks on said platform.

In testimony whereof I affix my signature in presence of two witnesses.

EMMET MOTT.

Witnesses:
J. K. SHARPE, Jr.,
LEE R. GARBER.

---

Copies of this patent may be obtained for five cents each, by addressing the "Commissioner of Patents, Washington, D. C."